US009753973B2

(12) United States Patent
Chen et al.

(10) Patent No.: US 9,753,973 B2
(45) Date of Patent: Sep. 5, 2017

(54) METHOD AND SYSTEM OF SEARCHING NOTE ITEMS

(71) Applicant: SPREADTRUM COMMUNICATIONS (SHANGHAI) CO., LTD., Shanghai (CN)

(72) Inventors: Hsiao Yu Chen, Shanghai (CN); Sung Hui Kao, Shanghai (CN); Chau Yan Wang, Shanghai (CN); Ming Shou Chen, Shanghai (CN); Yu Ting Tseng, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 422 days.

(21) Appl. No.: 14/540,371

(22) Filed: Nov. 13, 2014

(65) Prior Publication Data

US 2015/0134644 A1 May 14, 2015

(30) Foreign Application Priority Data

Nov. 13, 2013 (CN) .......................... 2013 1 0566280

(51) Int. Cl.
*G06F 17/30* (2006.01)
*G06F 3/0488* (2013.01)

(52) U.S. Cl.
CPC .... *G06F 17/30424* (2013.01); *G06F 3/04883* (2013.01); *G06F 17/30554* (2013.01)

(58) Field of Classification Search
CPC ......... G06F 17/30424; G06F 17/30554; G06F 3/04883
See application file for complete search history.

(56) References Cited

U.S. PATENT DOCUMENTS

| 8,196,066 B1* | 6/2012 | Ouyang | G06F 3/0488 |
| | | | 715/708 |
| 2012/0297348 A1* | 11/2012 | Santoro | G06F 3/04883 |
| | | | 715/863 |
| 2013/0241847 A1* | 9/2013 | Shaffer | G06F 3/038 |
| | | | 345/173 |
| 2014/0222825 A1* | 8/2014 | Ogawa | G06F 17/30619 |
| | | | 707/741 |

FOREIGN PATENT DOCUMENTS

| CN | 101526992 | 9/2009 |
| CN | 102473304 | 5/2012 |
| EP | 2474894 | 7/2012 |

* cited by examiner

*Primary Examiner* — Kris Mackes
(74) *Attorney, Agent, or Firm* — Hamre, Schumann, Mueller & Larson, P.C.

(57) ABSTRACT

A method and a system of searching note items by mobile terminals. The method includes the following steps: when marking a note item, detecting a gesture input from a touchscreen or choosing a gesture which has been input, and saving the gesture and the corresponding relation between the gesture and the note item into a memory; when a note item needs to be searched, detecting a gesture input from the touchscreen, and according to the input gesture, searching a matching gesture from the gestures saved in said memory, if the matching gesture is found, then displaying each note item corresponding to the matching gesture according to said corresponding relation. A custom gesture is created as a marker for a note item and the matching note item is displayed according to the input gesture when searching the note item.

8 Claims, 3 Drawing Sheets

METHOD AND SYSTEM OF SEARCHING NOTE ITEMS

FIELD

The present invention relates to the field of mobile terminals, especially relates to a method and system of searching note items.

BACKGROUND

At present, notepads have been more and more used in mobile terminal devices such as tablets or smartphones, and users can set a label for every note item. This kind of label can classify note items so that users can search all the note items with special labels recorded by himself or herself before through the labels.

However, notepad labels are realized by conventional text input in the prior art which may require multiple operating steps to reach the purpose of the demand, causing inconvenience to the user's operation. And from the viewpoint of protecting users' privacy, as the input text does not have personalized features, the privacy level is not high enough when identifying whether it is the user's own operation only by text, and it is easy to be guessed by others.

Therefore, it is urgent to find a method of searching note items which can help users search note items quickly and secretively.

BRIEF SUMMARY

The purpose of the present invention is to provide a method and system of searching note items. A custom gesture is created as a marker for a note item and the matching note item is displayed according to the input gesture when searching the note item, so that each relative note item can be found quickly. As the gesture is custom, it has its own style and is unique and secretive which cannot be guessed by others easily, and can be freely created without limit to the formalized software design.

To solve the above technical problems, one embodiment of the present invention discloses a method of searching note items, which includes the following steps:

when marking a note item, detecting a gesture input from a touchscreen or choosing a gesture which has been input, and saving the gesture and the corresponding relation between the gesture and the note item into a memory;

when a note item needs to be searched, detecting a gesture input from the touchscreen, and according to the input gesture, searching a matching gesture from the gestures saved in the memory, if the matching gesture is found, then displaying each note item corresponding to the matching gesture according to the corresponding relation.

Another embodiment of the present invention also discloses a system of searching note items, which includes:

a touchscreen, a memory, a gesture detecting unit for detecting a gesture input from a touchscreen;

a gesture saving unit for saving the gesture, which is detected by the gesture detecting unit or chosen from gestures having been input, and the corresponding relation between the gesture and a note item into the memory; and a searching unit for searching the matching gesture from the gestures saved in the memory according to the gesture detected by the gesture detecting unit, if the matching gesture is found, then displaying each note item corresponding to the matching gesture according to the corresponding relation.

Comparing the embodiments of the present invention with prior arts, the main differences and their effects are:

A custom gesture is created as a marker for a note item and the matching note item is displayed according to the input gesture when searching the note item, so that each relative note item can be found quickly. As the gesture is custom, it has its own style and is unique and secretive which cannot be guessed by others easily, and can be freely created without limit to the formalized software design.

Further, by combining factors such as the handwritten speed, the pressure of strokes with the similarity of patterns to match gestures, the corresponding gestures can be found more accurately. Different people have different habits when inputting gestures, such as speed, pressure, etc. These habits are not easy to be changed, and thus can be used as components of personalized gestures.

Further, it helps users to remember the gestures by displaying the thumbnails of gestures and the list of note items at the same time.

Further, if there is only one note item matching the gesture, opening the note item directly and displaying its specific content can further simplify the operation of users.

DETAILED DESCRIPTION

In the following description, numerous technical details are provided for readers to better understand the application. However, it will be understood by one of ordinary skilled in the art that the technical solution claimed to be protected by those claims of this application can also be realized even without these technical details and not based on various changes and modifications of the following embodiments.

For the purpose of technical solution and merits of the present invention to be further clarified, the following will further describe the embodiments of the present invention in detail with reference to the drawings.

Figure 1:
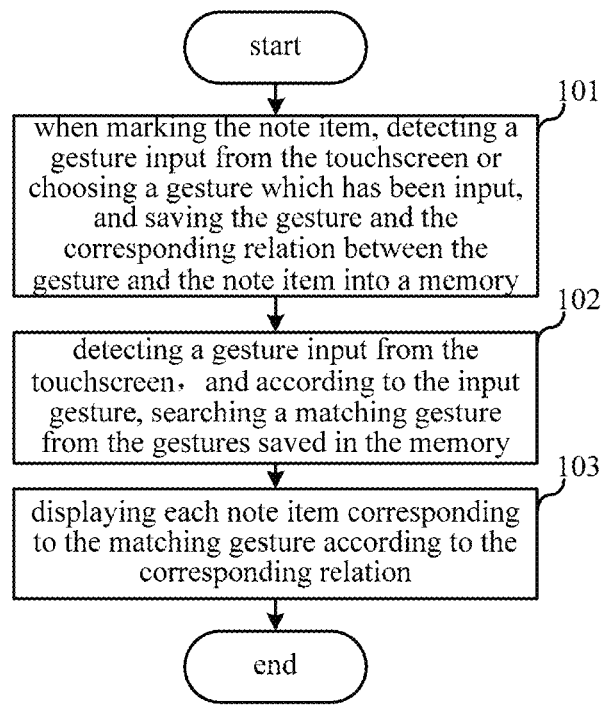
FIG. 1 illustrates a flowchart of a method of searching note items, according to the first embodiment of the present invention.

The first embodiment of the present invention relates to a method of searching note items. FIG. 1 illustrates a flowchart of the method of searching note items. The method of searching note items includes the following steps:

In step 101, when marking a note item, detecting a gesture input from a touchscreen or choosing a gesture which has been input, and saving the gesture and the corresponding relation between the gesture and the note item into a memory.

Preferably, the input gestures are custom and not limited to several gestures pre-defined in the system.

When a note item needs to be searched through, it proceeds to step 102, detecting a gesture input from the touchscreen, and according to the input gesture, searching a matching gesture from the gestures saved in the memory.

The gesture contains the following information:

pattern, handwritten speed of strokes making up the pattern, writing area and pressure of strokes making up the pattern, order and track of strokes making up the pattern;

In addition, it can be understood that the handwritten speed of strokes making up the pattern may be relative to the speed of each stroke, which can be judged combining with a pattern similarity, thus increasing the accuracy of the gesture judgement.

Furthermore, when detecting the pressure of strokes making up the pattern, it may need the support of a relevant hardware, such as a stylus with a pressure-sensitive function or a touchscreen with a pressure-sensing function by itself.

In the step of searching the matching gesture, whether two gestures are matched is determined by the following way:

if the similarity of the patterns of two gestures exceeds a predetermined threshold, and the similarity of the handwritten speeds of the strokes of the patterns of two gestures exceeds a predetermined threshold, and the similarity of the writing areas and the pressures of the strokes of the patterns of two gestures exceeds a predetermined threshold, and the similarity of the orders and the tracks of the strokes of the patterns of two gestures exceeds a predetermined threshold, conforming with the above detection, then determines that the two gestures are matched.

By combining factors such as the handwritten speed, the pressure of strokes with the similarity of patterns to match gestures, the corresponding gestures can be found more accurately. Different people have different habits when inputting gestures, such as speed, pressure etc. These habits are not easy to be changed, and thus can be used as components of personalized gestures.

If the matching gesture is found, then proceeds to step 103, displaying each note item corresponding to the matching gesture according to the corresponding relation. Otherwise, it prompts users that the note item does not exist.

In the step 103, if there are at least two note items corresponding to the matching gesture, then a list of the corresponding note items is displayed.

If there is only one note item corresponding to the matching gesture, then the specific content of the note item is directly displayed.

Preferably, when displaying the list of note items, the list includes note items and a thumbnail of the pattern of the corresponding gesture. It can help users to remember the gestures by displaying the thumbnails of gestures and the list of note items at the same time.

Preferably, if there is only one note item matching the gesture, opening the note item directly and displaying its specific content can further simplify the operation of users.

In the present invention, a custom gesture is created as a marker for a note item and the matching note item is displayed according to the input gesture when searching the note item, so that each relative note item can be found quickly. As the gesture is custom, it has its own style and is unique and secretive which cannot be guessed by others easily, and can be freely created without limit to the formalized software design.

The second embodiment of the present invention relates to a method of searching note items. FIG. 2 to FIG. 5 illustrate operation charts of the method of searching note items.

When making notes using a notepad, it allows users to set a label for each note, wherein the label may use a gesture control to replace a traditional text input. Assuming users need to set a label of "to do" for a note originally, the users can use a gesture "+" instead of the original text input. It allows users to set their own gesture control they can think of to quickly classify the notes for their own notepad through labels.

The same gesture can be used as a label for the same kind of notes so that users can find all the notes recorded by themselves with the same gesture through this gesture "+", as if there is an notepad understanding users very much, letting a person fondle admiringly.

Figure 2:
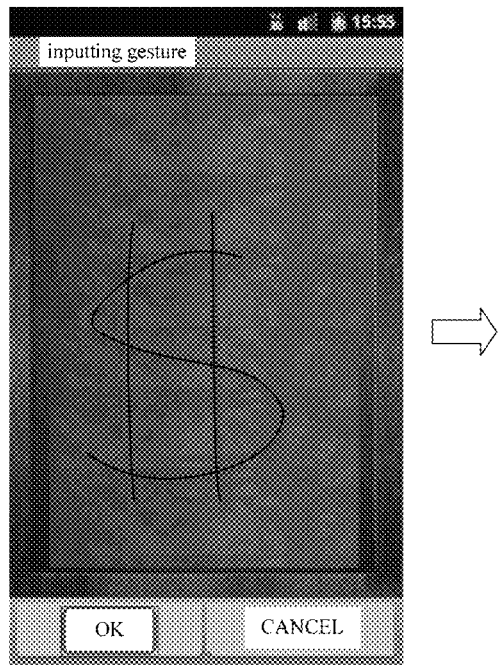
FIG. 2-5 illustrate operation charts of a method of searching note items, according to the first embodiment of the present invention.

After inputting a note (namely note item), users can set a custom gesture from a menu, as illustrated in FIG. 2, the user enters a gesture of a dollar sign in the interface for inputting gestures. Users can also select a gesture from previous set gestures. After the set is completed, the "OK" button in FIG. 2 is pressed, then this note will be stored along with the sign of the gesture pattern.

Figure 3:
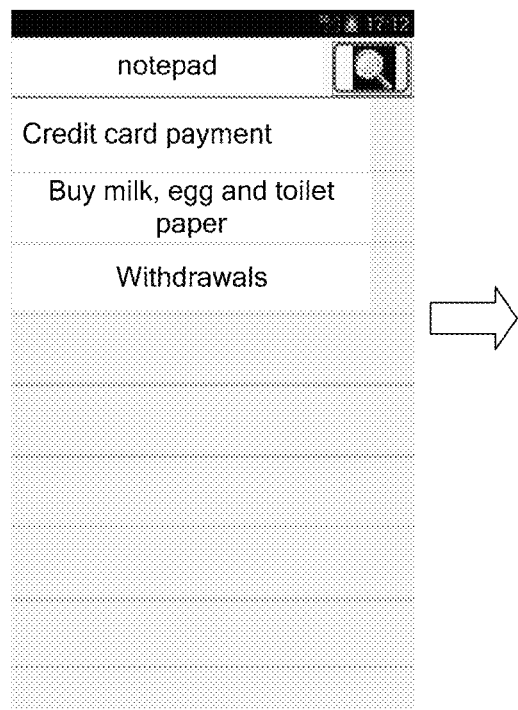
Figure 4:
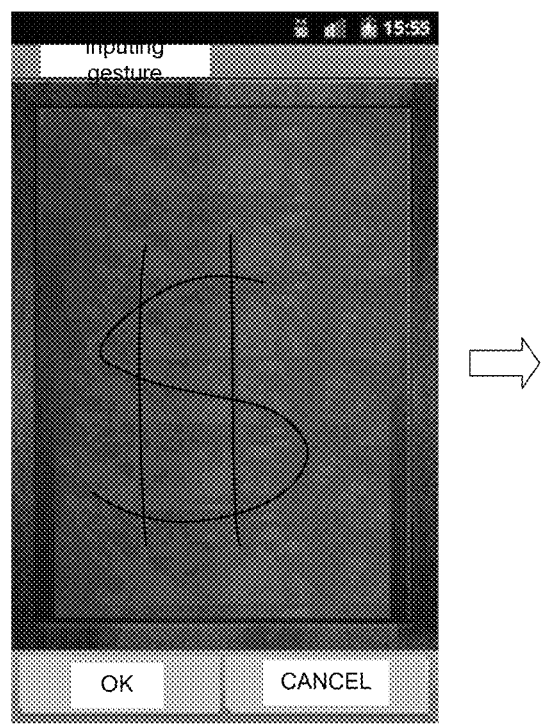

After entering the notepad, users can input the pattern of the gesture they want to search to look for the note content through a search mode. As illustrated in FIG. 3, the search mode is clicked, then proceeds to the interface for inputting a gesture as shown in FIG. 4.

After the user inputs a gesture, whether it is the pattern of the gesture set by the user himself is determined by judging the information such as the pattern of the gesture, the handwritten speed, the writing area and the strength, and the handwritten order and track, etc.

Figure 5:
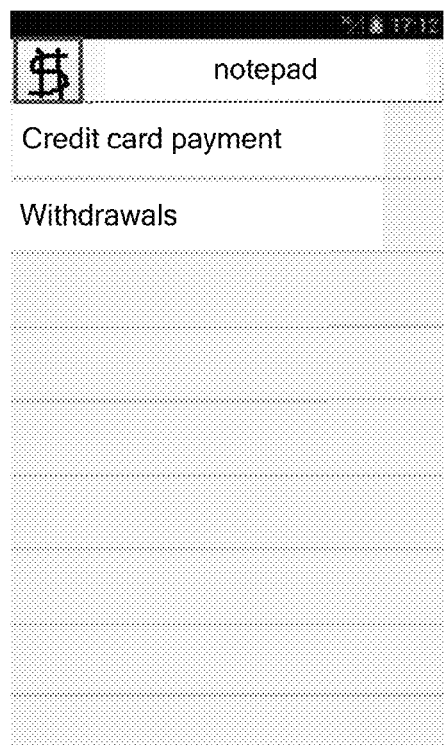

If it is confirmed that the pattern of the gesture is the one set by the user himself in FIG. 2, then a list of note items corresponding to the pattern of the gesture is displayed, as shown in FIG. 5.

In this embodiment, simple gesture symbols can be used as markers for notepads, and new note items can be stored after setting gestures.

The advantages of the present embodiment are mainly reflected in:

The gesture control can be used to replace the original function. For example, in the prior art, the user needs to click on the menu, and after the phone prompts function options and an function option is selected based on the user's purpose, the corresponding function is performed.

The function which originally requires multiple steps to realize can be achieved in one step by using a gesture control, which is convenient and fast, and can reach the purpose of users;

In addition, the pattern of the gesture control can be used to replace the original ways of text input or digital input, which can not only save the user's input time, but also add a lot of fun to use.

The method embodiments of the present invention all can be realized by software, hardware and firmware etc. Regardless of the present invention is realized by software, or hardware, or firmware, the instruction codes can be stored in any type of computer accessible memory (such as permanent or can be modified, volatile or non-volatile, solid-state or non solid, fixed or replaceable medium etc.). Similarly, the memory can be, for example, programmable array logic (PAL), random access memory (RAM), programmable read only memory (PROM), read-only memory (ROM), electrically erasable programmable ROM (EEPROM), floppy disc, optical disc, and digital versatile disc (DVD) etc.

Figure 6:
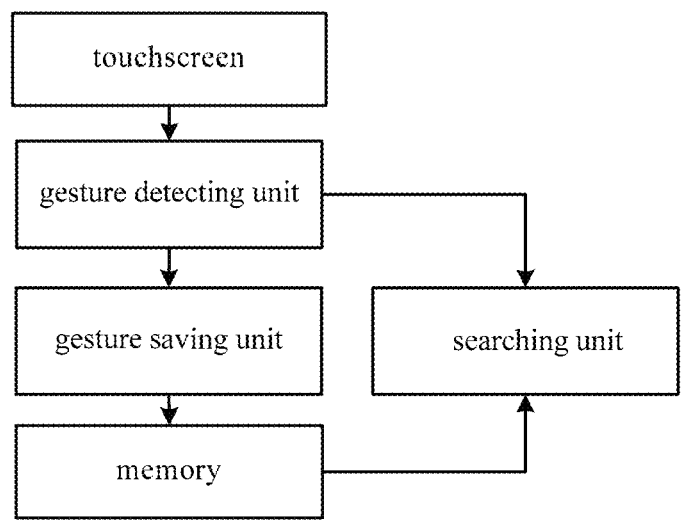
FIG. 6 illustrates a block diagram of a system of searching note items, according to the second embodiment of the present invention.

The third embodiment of the present invention relates to a system of searching note items. FIG. 6 illustrates a block diagram of the system of searching note items.

Specifically, as shown in FIG. 6, the system of searching note items comprises:

a touchscreen, a memory, a gesture detecting unit for detecting a gesture input from a touchscreen;

a gesture saving unit for saving the gesture, which is detected by the gesture detecting unit or chosen from gestures having been input, and the corresponding relation between the gesture and a note item into the memory; and a searching unit for searching a matching gesture from the gestures saved in the memory according to the gesture detected by the gesture detecting unit, and if the matching gesture is found, displaying each note item corresponding to the matching gesture according to the corresponding relation.

Preferably, a gesture contains the following information: pattern, handwritten speed of strokes making up the pattern, writing area and pressure of strokes making up the pattern, order and track of strokes making up the pattern.

The following way is employed by the searching unit to determine whether two gestures are matched:

if the similarity of the patterns of two gestures exceeds a predetermined threshold, and the similarity of the handwritten speeds of the strokes of the patterns of two gestures exceeds a predetermined threshold, and the similarity of the writing areas and the pressures of the strokes of the patterns of two gestures exceeds a predetermined threshold, and the similarity of the orders and the tracks of the strokes of the patterns of two gestures exceeds a predetermined threshold, conforming with the above detection, then determines that the two gestures are matched.

In the present invention, the system of searching note items is a smartphone.

The system of searching note items may also be a tablet personal computer.

The system of searching note items may also be a laptop with a touchscreen.

In addition, it can be understood that the system of searching note items may also be other mobile terminal device with a touchscreen.

The first and second embodiments are the method embodiments corresponding to this embodiment, and this embodiment and the first and second embodiments can be implemented in cooperation with each other. Correlated technical details disclosed in the first and second embodiments are still effective in this embodiment and will not be repeated here in order to reduce duplication. Correspondingly, correlated technical details disclosed in this embodiment can also be applied in the first and second embodiments.

It should be noted that the units disclosed in each device embodiment of the present invention are logical units, on the physical, a logic unit can be a physical unit, and may be part of a physical unit, or implemented in combination of several physical units, and physical implementing methods for these logic units themselves are not the most important, the combination of the functions achieved by these logic units is the key to solving the technical problem disclosed in the present invention. Furthermore, in order to highlight the innovative part of the present invention, the above device embodiments of the present invention do not introduce the units which are not related closely to solving the technical problem disclosed in the present invention, which does not indicate that the above device embodiments do not include other units.

It should be explained that in the Claims and Description of the present invention, relationship terms such as first, second etc are just utilized to distinguish one entity or manipulation from another entity or manipulation, instead of requiring or indicating any practical relation or sequence existing between these entities or manipulations. And the terms "include", "comprise" or any other variant indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "include a" does not exclude additional same elements existing in the process, method, article or equipment of this element.

By referring to certain preferred embodiments of the present invention, the present invention has been shown and described. But it should be understood to those skilled in the art that various other changes in the forms and details may be made without departing from the principles and scope of the invention.

What is claimed is:

1. A method of searching note items, wherein the method includes the following steps:

when marking a note item, detecting a gesture input from a touchscreen or choosing a gesture which has been input, and saving the gesture and the corresponding relation between the gesture and the note item into a memory;

when a note item needs to be searched, detecting a gesture input from the touchscreen, and according to the input gesture, searching a matching gesture from the gestures saved in said memory, if the matching gesture is found, then displaying each note item corresponding to the matching gesture according to said corresponding relation, wherein said gesture contains the following information: pattern, handwritten speed of strokes making up the pattern, writing area and pressure of strokes making up the pattern, order and track of strokes making up the pattern; and wherein in said step of searching a matching gesture, whether two gestures are matched is determined by the following way:

if the similarity of the patterns of two gestures exceeds a predetermined threshold, and the similarity of the handwritten speed of the strokes of the patterns of two gestures exceeds a predetermined threshold, and the similarity of the writing area and the pressure of the strokes of the patterns of two gestures exceeds a predetermined threshold, and the similarity of the order and the track of the strokes of the patterns of two gestures exceeds a predetermined threshold, conforming with the above detection, then determines that the two gestures are matched.

2. The method according to claim 1, wherein the following step is further included:

displaying a list of note item(s), the list includes note item(s) and a thumbnail of the pattern of the corresponding gesture.

3. The method according to claim 1, wherein in the step of displaying each note item corresponding to the matching gesture according to said corresponding relation, if there are at least two note items corresponding to the matching gesture, a list of the corresponding note items is displayed.

4. The method according to claim 1, wherein in the step of displaying each note item corresponding to the matching gesture according to said corresponding relation, if there is only one note item corresponding to the matching gesture, the specific content of the note item is directly displayed.

5. A system of searching note items, wherein the system comprises:

a touchscreen;

a memory;

a gesture detecting unit for detecting a gesture input from a touchscreen;

a gesture saving unit for saving the gesture, which is detected by said gesture detecting unit or chosen from gestures having been input, and the corresponding relation between the gesture and a note item into the memory; and a searching unit for searching a matching gesture from the gestures saved in said memory according to the gesture detected by said gesture detecting unit, and if the matching gesture is found, displaying each note item corresponding to the matching gesture according to said corresponding relation, wherein said gesture contains the following information:

pattern, handwritten speed of strokes making up the pattern, writing area and pressure of strokes making up the pattern, order and track of strokes making up the pattern, and wherein the following way is used by said searching unit to determine whether two gestures are matched:

if the similarity of the patterns of two gestures exceeds a predetermined threshold, and the similarity of the handwritten speed of the strokes of the patterns of two gestures exceeds a predetermined threshold, and the similarity of the writing area and the pressure of the strokes of the patterns of two gestures exceeds a predetermined threshold, and the similarity of the order and the track of the strokes of the patterns of two gestures exceeds a predetermined threshold, conforming with the above detection, then determines that the two gestures are matched.

6. The system according to claim 5, wherein said system of searching note items is a smartphone.

7. The system according to claim 5, wherein said system of searching note items is a tablet personal computer.

8. The system according to claim 5, wherein said system of searching note items is a laptop with a touchscreen.

* * * * *